United States Patent Office 3,637,573
    Patented Jan. 25, 1972

3,637,573
    POLYURETHANES STABILIZED WITH
    p-PHENYLENEDIAMINES
    Noritoshi Mise, Ikeda, Minoru Yamada, Suita, and Ken-
    ichi Nishino, Takatsuki, Japan, assignors to Takeda
    Chemical Industries Ltd., Osaka, Japan
    No Drawing. Filed Nov. 27, 1967, Ser. No. 685,947
    Claims priority, application Japan, Nov. 28, 1966,
    41/78,195
    Int. Cl. C08g 51/60, 51/08
    U.S. Cl. 260—37 N           6 Claims

ABSTRACT OF THE DISCLOSURE

A stabilized polyurethane composition containing p-phenylenediamine of the following formula:

wherein each of X and Y stands for a substituted or unsubstituted hydrocarbon group.

---

This invention relates to stabilized polyurethane compositions. More particularly, the invention relates to stabilized polyurethane compositions comprising isocyanate-terminated prepolymer, which is derived from polyisocyanate and polyoxypropylene polyol, and a certain p-phenylenediamine.

It is known that polyurethane prepolymer derived from polyisocyanate and polyol is applicable for sealants, coatings, adhesives, etc.

However, polyurethane prepolymer is bound up with the defect that its physical properties are impaired under the influence of ultraviolet rays, oxygen, moisture, etc., when it is exposed to out-door weathering.

Although various kinds of stabilizers have been added to polyurethane prepolymer, no prior proposal has satisfactorily overcome the aforesaid defect.

The present invention obviates the said defect by adding p-phenylenediamine, as stabilizer, to isocyanate-terminated prepolymer which is derived from polyisocyanate and polyoxypropylene polyol.

It is an object of the present invention to provide polyurethane prepolymer stable to out-door weathering (e.g. ultraviolet rays, oxygen, moisture, etc.).

It is another object to provide polyurethane resin which does not deteriorate even after exposure to atmosphere for a rather long period of time.

A further object is to provide a so-called sealant (sealing material) stable to out-door weathering.

In the present invention, p-phenylenediamine is added to isocyanate-terminated prepolymer derived from polyisocyanate and polyoxypropylene polyol.

The isocyanate-terminated prepolymer of this invention is that obtained by the reaction of polyisocyanate compound with polyoxypropylene polyol in a ratio NCO/OH (molar ratio) of not less than about 1.1, and prepolymer having an NCO content of about 0.5 to about 10 weight percent is desirably used.

As polyisocyanate compounds, there are used those having not less than two NCO groups per molecule and an average molecular weight per NCO group of about 60 to about 500, such compounds being exemplified by 2,4-tolylene diisocyanate, 2,6-tolylene diisocyanate, p-phenylene diisocyanate, m-phenylene diisocyanate, 4,4'-methylene-bis-pehnyl-diisocyanate, naphthylene diisocyanate, p-xylylene diisocyanate, m-xylylene diisocyanate, hexamethylene diisocyanate, tetramethylene diisocyanate, dimer of tolylenediisocyanate, and trimer of tolylene diisocyanate, and by addition product obtained by the reaction of above-mentioned polyisocyanate with low molecular polyol such as ethylene glycol, propylene glycol, diethylene glycol, dipropylene glycol, glycerol, hexanetriol, trimethylol propane, etc.

As the polyoxypropylene polyol in this invention, there are used those having not less than two OH groups per molecule, and having an average molecular weight per OH group of about 200 to about 3000, and which are exemplified by polyoxypropylene glycol and polyoxypropylene triols including those prepared by using glycerol, trimethylol propane, hexanetriol, etc. as an initiator.

The p-phenylenediamines employed in the present invention are represented by the following general formula:

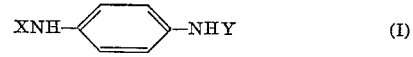     (I)

wherein each of X and Y stands for a substituted or unsubstituted hydrocarbon group.

As the hydrocarbon group, there are included aromatic hydrocarbon groups such as phenyl, naphthyl, etc., aliphatic hydrocarbon groups such as alkyl (e.g. methyl, ethyl, propyl, isopropyl, butyl, t-butyl, hexyl, lauryl, stearyl, etc.), and alkenyl (e.g. vinyl, allyl, butenyl, etc.) and alicyclic hydrocarbon groups such as cyclohexyl and cyclopentyl, and the hydrocarbon group may be substituted by one or more of halogen (e.g. Cl, Br, I), lower alkyl (e.g. methyl, ethyl, propyl), lower alkoxy (e.g. methoxy, ethoxy, propoxy, etc.), etc.

Among the p-phenylenediamines, use is desirably made of those wherein at least one of X and Y stands for an aromatic hydrocarbon group such as phenyl, α-naphthyl, β-naphthyl, tolyl, mono-chlorophenyl, dichlorophenyl, monomethoxyphenyl, and dimethoxyphenyl, and the other is either an aromatic hydrocarbon group as above defined or stands for an alkyl or alkenyl group of 1 to 18 carbon atoms, more desirably 1 to 5 carbon atoms, such as methyl, ethyl, propyl, isopropyl, butyl, t-butyl, amyl, isoamyl, hexyl, lauryl, stearyl, allyl and butenyl.

Most typical examples of the desirable p-phenylene diamines are as follows:

(1) N,N'-diphenyl-p-phenylenediamine,
    (2) N,N'-di-β-naphthyl-p-phenylenediamine,
    (3) N-phenyl-N'-isopropyl-p-phenylenediamine,
    (4) N-phenyl-N'-tert-butyl-p-phenylenediamine,
    (5) N,N'-di-p-chlorophenyl-p-phenylenediamine,
    (6) N,N'-di-p-tolyl-p-phenylenediamine,
    (7) N,N'-di-p-methoxyphenyl-p-phenylenediamine.

The present prepolymer composition is generally prepared by adding the p-phenylenediamine to the prepolymer, but the diamine can be previously added to the polyisocyanate compound and/or polyoxypropylene polyol, if desired.

The amount of the p-phenylenediamine to be added is about 0.01 to about 5 weight percent, preferably about 0.1 to about 3 weight percent, relative to the prepolymer.

The present prepolymer composition can be mixed with other additives such as fillers (e.g. calcined plaster, calcium carbonate, silica, talc, magnesium carbonate, clays, cements, etc.), pigments (e.g. carbon, titanium dioxide, aluminum powder, etc.), plasticizers (dioctyl phthalate, dibutyl phthalate, dicresyl phosphite, coal tar, etc.), dyes, antioxidants, etc.

Thus-prepared composition per se can be used as so-called moisture-cure-type sealant, adhesive, paint, etc., but is particularly useful for moisture-cure-type sealant.

The present composition can be used also as so-called two-can type sealant, adhesive, coating, paint, etc., with the use of per se known curing agent.

When the present prepolymer composition is used as moisture-cure-type sealant or paint, it is desirable to incorporate about 5 to about 500 weight percent, more advantageously about 10 to about 300 weight percent of the fillers into the composition.

The composition, when applied to practical use as sealant, paint, etc., is cured with the aid of moisture in the air, and remains stable without deterioration of its properties or appearance for a rather long period of time.

Polyurethane resin can be prepared by subjecting the prepolymer composition to a curing reaction with the use of a curing agent such as water, low-molecular polyamine (e.g. 3,3'-dichlorobenzidine, 4,4'-methylene-bis(2-chloraniline), ethylenediamine, p-phenylenediamine and 2,4-diaminotoluene, etc.), polyol (e.g. ethylene glycol, diethylene glycol, propylene glycol, dipropylene glycol, polyoxytetramethylene glycol, glycerol, trimethylol propane, hexanetriol, polyoxypropylenetriols including those prepared by using glycerol, trimethylol propane, hexanetriol, etc. as an initiator), castor oil and the like.

Thus-prepared polyurethane resin is stable to atmospheric conditions and no deterioration of its properties is found even after exposure to atmosphere for a rather long period of time.

For the purpose of a better understanding of this invention, the following examples are given. However, it is to be understood that this invention is not intended to be limited to these examples.

In these examples, "parts" means parts by weight unless otherwise specified. Parts by weight bear the same relation to parts by volume as do grams to milliliters.

Throughout the specification, the abbreviations "kg.," "cm." and "cps." represent "kilogram(s)," "centimeter(s)" and "centipoises," respectively.

Example 1

A vessel equipped with a stirrer, a nitrogen inlet and a condenser, is charged with 2,400 parts of polyoxypropylene glycol (average molecular weight 2,000), 300 parts of polyoxypropylene triol (average molecular weight 3,000) prepared by using glycerol as an initiator, and 313 parts of tolylenediisocyanate (a mixture of 80 parts of 2,4-isomer and 20 parts of 2,6-isomer) with agitation under nitrogen stream, and the mixture is heated at 85–90° C. with agitation under nitrogen stream for 5 hours, whereby a colorless, viscous liquid (prepolymer) of amine equivalent 3,560, viscosity 156,000 cps. at 25° C. is obtained.

To 100 parts of thus-prepared prepolymer, there is added 0.5 part of N,N'-diphenyl-p-phenylenediamine. The mixture is molded in a thickness of 0.5 cm. and allowed to stand under conditions of 25° C. and relative humidity 50%. The molded composition becomes tack-free after 50 hours and completely cured after 7 days. The molded composition is allowed to stand under the same conditions for 21 days. Thus-prepared cured composition is aged for 300 hours in a weatherometer and its properties are tested.

As controls, three kinds of molded polyurethane elastomers are prepared in the same manner as above except that no N,N'-diphenyl-p-phenylenediamine is used, 2,6-di-tert-butyl-p-cresol is used in place of N,N'-diphenyl-p-phenylenediamine, and UV absorber (e.g. N-(2-hydroxy-4-methylphenyl)-benzothiazole, commercially available as "Tinuvin P") is used in place of N,N'-diphenyl-p-phenylenediamine, respectively, and the properties of the control compositions are also tested.

The results are shown in Table 1.

TABLE 1

| Stabilizer | Tensile strength (kg./square cm.) | | Elongation (percent) | |
|---|---|---|---|---|
|  | Before aging | After aging | Before aging | After aging |
| None | 31.2 | 5.7 | 1,200 | 400 |
| N,N'-diphenyl-p-phenylene diamine | 30.5 | 28.8 | 1,150 | 1,220 |
| 2,6-di-tert butyl-p-cresol | 28.8 | 12.1 | 1,200 | 700 |
| Tinuvin P | 29.3 | 8.8 | 1,350 | 950 |

As shown in the table, in the three specimens containing no stabilizer, containing 2,6-di-tert-butyl-p-cresol and containing Tinuvin P, there is observed a large deterioration of properties, and moreover the surfaces of these specimens become malt syrup-like after aging. In sharp contrast, in the specimen containing N,N'-diphenyl-p-phenylenediamine, there is found substantially no deterioration of properties.

EXAMPLE 2

To a mixture of 1,800 parts of polyoxypropylene glycol (average molecular weight 2000) and 900 parts of polyoxypropylene triol (average molecular weight 3000) prepared by using glycerol as an initiator, there are added with agitation 1,000 parts of calcined plaster, 1,200 parts of dioctylphthalate, 400 parts of titanium oxide and 40 parts of carbon. Thus-prepared paste is mixed with 450 parts of 4,4'-methylene-bis-phenyl-diisocyanate and the mixture is kneaded for 3 hours in vacuo at 80 to 90° C., whereby isocyanate-terminated prepolymer paste is prepared. 100 parts of the prepolymer thus obtained is mixed with 2 parts of N,N'-dinaphthyl-p-phenylenediamine.

The mixture is applied onto polyethylene film in a thickness of 0.5 cm. and is allowed to stand under conditions of 25° C. and relative humidity 50%.

The mixture becomes tack-free after 36 hours and completely cured after 5 days. Thus-prepared cured composition is exposed to atmosphere.

Even after 6 months' exposure, no appreciable change is observed in the composition.

As a control, a cured plyurethane composition is prepared by the same process as above except that no N,N'-p-phenylenediamine is used. Many cracks are observed on the surface of the cured composition after 2 months' exposure to atmosphere.

EXAMPLE 3

A mixture of 1,800 parts of polyoxypropylene glycol (average molecular weight 2000) and 300 parts of polyoxypropylene triol (average molecular weight 3000) prepared by using glycerol as an initiator, is allowed to react with 313 parts of tolylene diisocyanate (a mixture of 80 parts of 2,4-isomer and 20 parts of 2,6-isomer) with agitation under nitrogen stream to give a colorless, viscous liquid (prepolymer) showing amine equivalent of 1,760, viscosity 48,000 cps. at 25° C.

300 parts of the prepolymer is mixed with 100 parts of dioctylphthalate, 200 parts of calcined plaster and 1 part of carbon in a vacuum kneader to obtain a paste-like substance.

100 parts of the paste is mixed with 10 parts of N,N'-dimethylformamide containing 30% of 4,4'-methylene-bis (O-chloraniline).

55 parts of the mixture is further mixed with 1.5 parts of N-isopropyl-N'-phenyl-p-phenylenediamine and the whole mixture is allowed to stand at 25° C. under relative humidity 50% for 3 days to completely cure the composition, after which period the cured composition is exposed to atmosphere.

On the other hand, 55 parts of the above-prepared mixture containing no N-isopropyl-N'-phenyl-p-phenylenediamine is treated in the same manner as above to prepare cured composition.

There is found no appreciable change in the cured composition containig the p-phenylenediamine even after 14 months exposure to atmosphere, while many cracks are observed in the cured composition containing no p-phenylenediamine after 7 months' exposure to atmosphere.

EXAMPLE 4

100 parts of the same prepolymer as in Example 1 is kneaded in vacuo with 30 parts of calcined plaster, 20 parts of calcium carbonate, 3 parts of carbon and 20 parts of dioctyl phthalate.

To the mixture is added 1 part each of the following compounds as stabilizer. Thus-prepared compositions are cured by the same conditions as in Example 1 and exposed to out-door weathering:

(1) N-phenyl-N'-naphthyl-p-phenylenediamine (a compound according to this invention);
(2) 2,5-di-tert-butyl-hydroquinone;
(3) 4,4'-butylidene-bis(6-tert-butyl-m-cresol);
(4) 2,2'-methylene-bis(4-methyl-6-tert-butyl phenol);
(5) 2-mercapto-benzimidazole;
(6) styrenated phenol (commercially available e.g. as "Antage ST")
(7) alkylated aryl phosphite (commercially available e.g. as "Antage TNT")
((2) to (7): controls.)

After 3 months' exposure many cracks were observed on the surface of each of the cured compositions prepared as controls, while in the cured compositions containing compound 1), no appreciable change was observed even after 24 months' exposure.

What is claimed is:

1. A stabilized polyurethane prepolymer composition consisting essentially of an isocyanate-terminated prepolymer having an NCO content of about 0.5 to about 10 weight percent, in the form of a reaction product of a polyisocyanate and polyoxypropylene polyol having an average molecular weight per OH group of about 200 to about 3000, in a ratio of NCO/OH (molar ratio) of not less than about 1.1, and a p-phenylenediamine stabilizer of the following formula:

XNH—⟨ ⟩—NHY wherein at least one of X and Y stands for an aromatic hydrocarbon selected from the group consisting of phenyl, α-naphthyl, β-naphthyl, tolyl, mono-chlorophenyl, dichlorophenyl, monomethoxyphenyl and dimethoxyphenyl, and the other is an alkyl or alkenyl group of 1 to 18 carbon atoms, said phenylenediamine being used in amounts of 0.01 to about 5 weight percent relative to the prepolymer.

2. A stabilized polyurethane sealant composition consisting essentially of an isocyanate-terminated prepolymer having an NCO content of about 0.5 to about 10 weight percent, in the form of a reaction product of polyisocyanate and polyoxypropylene polyol having an average molecular weight per OH group of about 200 to about 3000, in a ratio of NCO/OH (molar ratio) of not less than about 1.1, a filler in the amount of about 5 to about 500 weight percent relative to the prepolymer, and a p-phenylenediamine stabilizer of the formula

XNH—⟨ ⟩—NHY wherein at least one of X and Y stands for an aromatic hydrocarbon selected from the group consisting of phenyl, α-naphthyl, β-naphthyl, tolyl, mono-chlorophenyl, dichlorophenyl, mono-methoxyphenyl and dimethoxyphenyl, and the other is an alkyl or alkenyl group of 1 to 18 carbon atoms.

3. A stabilized polyurethane prepolymer composition consisting essentially of an isocyanate-terminated prepolymer having an NCO content of about 0.5 to about 10 weight percent, in the form of a reaction product of polyisocyanate and polyoxypropylene polyol having an average molecular weight per OH group of about 200 to about 3000, in a ratio of NCO/OH (molar ratio) of not less than about 1.1, and N-phenyl-N'-naphthyl-p-phenylenediamine as a stabilizer in a ratio of about 0.01 to about 5 weight percent relative to the prepolymer.

4. A stabilized polyurethane sealant composition consisting essentially of isocyante-terminated prepolymer having an NCO content of about 0.5 to about 10 weight percent, in the form of a reaction product of polyisocyanate and polyoxypropylene polyol having an average molecular weight per OH group of about 200 to about 3000, in a ratio of NCO/OH (molar ratio) of not less than about 1.1, a filler in the amount of about 5 to about 500 weight percent relative to the prepolymer, and N-phenyl-naphthyl-p-phenylenediamine as a stabilizer in a ratio of about 0.01 to about 5 weight percent relative to the prepolymer.

5. A stablized polyurethane resin prepared from the polyurethane prepolymer composition according to claim 3.

6. A stabilized polyurethane resin prepared from the polyurethane prepolymer composition according to claim 1.

References Cited

UNITED STATES PATENTS

| | | | |
|---|---|---|---|
| 3,044,990 | 7/1962 | Steuber | 260—77.5 C |
| 3,194,793 | 7/1956 | Kogon | 260—77.5 AM |
| 3,285,879 | 11/1966 | Larson | 260—77.5 AM |
| 3,399,167 | 8/1968 | Rosendahl | 260—77.5 AM |
| 3,402,200 | 9/1968 | Hayes | 260—45.9 |

OTHER REFERENCES

Rubber World, "Materials and Compounding Ingredients for Rubber and Plastics," 1965, pages 151, 167, 169, 170, 194.

P. R. MICHL, Primary Examiner

MORRIS LIEBMAN, Assistant Examiner

U.S. Cl. X.R.

260—45.9 R, 77.5 AM, 77.5 SS